(No Model.)

W. F. BEARDSLEE.
ADJUSTABLE CAM OR ECCENTRIC.

No. 324,639. Patented Aug. 18, 1885.

Witnesses.
Fred L. Emery.
John F. Nelson.

Inventor.
William F. Beardslee
per Crosby & Gregory
his Attys.

UNITED STATES PATENT OFFICE.

WILLIAM F. BEARDSLEE, OF BOSTON, MASSACHUSETTS, ASSIGNOR TO THE MANUFACTURERS SPECIAL MACHINE COMPANY, OF DANBURY, CONN.

ADJUSTABLE CAM OR ECCENTRIC.

SPECIFICATION forming part of Letters Patent No. 324,639, dated August 18, 1885.

Application filed May 18, 1885. (No model.)

*To all whom it may concern:*

Be it known that I, WILLIAM F. BEARDSLEE, of Boston, county of Suffolk, State of Massachusetts, have invented an Improvement in Adjustable Cams or Eccentrics, of which the following description, in connection with the accompanying drawings, is a specification, like letters on the drawings representing like parts.

My invention has for its object to provide a cam or eccentric which may be readily adjusted positively on or with relation to its carrying-shaft in a direction at right angles thereto, and to be held positively in place.

Figure 1:
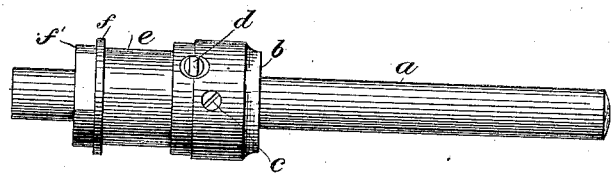
Figure 2:
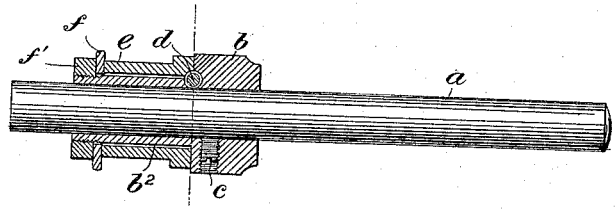
Figure 3:
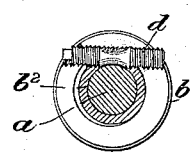

Figure 1 in elevation shows a shaft provided with an adjustable cam or eccentric; Fig. 2, a partial section of Fig. 1; Fig. 3, a section of Fig. 2 on the line $x\ x$, and Figs. 4 and 5 a longitudinal and cross section of a modification of my invention.

My invention consists, essentially, in the combination of a rotating shaft and a screw-holder connected therewith, and a screw, with a cam or eccentric made as a sleeve, the screw being restrained from endwise movement by the screw-holder, but being free to rotate, the threads of the screw engaging screw-threads of the cam or eccentric, and moving the same at right angles to the axis or center of the shaft.

The shaft $a$ has secured to it a collar, $b$, by means of a screw, $c$, the said collar having a sleeve, $b^2$, forming a holder for the adjusting-screw $d$, which is so made as to rotate in but not to move longitudinally with relation to the screw-holder.

The threads of the screw engage threads cut in the cam or eccentric $e$, made as a sleeve, and by engaging one end of the said screw by a wrench or other suitable tool the said screw may be rotated to thereby adjust the cam or eccentric diametrically on or with relation to the shaft, the screw moving the cam or eccentric positively, and holding it fixedly in adjusted position.

The screw shown in Figs. 1 and 3 has an annular groove or recess at or near the middle of its length, which receives the periphery of the shaft $a$, and the screw has threads at each side of the said recess.

Figure 4:
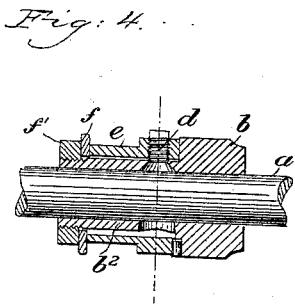
Figure 5:
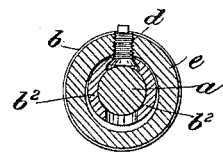

In Figs. 4 and 5 the inner side of the screw-holder has a countersink or recess to receive the foot of the screw $d$ loosely, and the threads of the screw engage threads of the cam or eccentric, the said screw being free to rotate, but being restrained from longitudinal movement with relation to the screw-holder, to thus operate as do the like designated parts before described.

I do not broadly claim a cam or eccentric made diametrically adjustable on a shaft.

The cam or eccentric is prevented from straining the screw $d$ laterally by the shoulder of the collar $b$, and the washer $f$ and nut $f'$.

I claim—

A rotating shaft, a screw-holder thereon, and a cam or eccentric, combined with an adjusting-screw the threads of which engage screw-threads of the cam or eccentric, the said screw being free to rotate in the screw-holder, but being restrained from movement in the direction of its length, or at right angles to the center of rotation of the shaft, substantially as described.

In testimony whereof I have signed my name to this specification in the presence of two subscribing witnesses.

WILLIAM F. BEARDSLEE.

Witnesses:
CHARLES RUSSELL,
JOHN FITZER.